United States Patent [19]
Van Beersel et al.

[11] Patent Number: 4,728,550
[45] Date of Patent: Mar. 1, 1988

[54] COATED RECOVERABLE ARTICLES

[75] Inventors: Jos Van Beersel, Temse; Eddy Alaerts, Herselt, both of Belgium

[73] Assignee: NV Raychem SA, Kessel-lo, Belgium

[21] Appl. No.: 841,063

[22] Filed: Mar. 18, 1986

[30] Foreign Application Priority Data

Mar. 21, 1985 [GB] United Kingdom ............... 8507374

[51] Int. Cl.⁴ .................... F16L 55/18; F16L 58/00
[52] U.S. Cl. ................................ 428/36; 428/343; 428/346; 428/347; 428/354; 174/DIG. 8; 285/53
[58] Field of Search ............. 428/36, 343, 346, 347, 428/354; 174/DIG. 8; 285/53, 187

[56] References Cited

U.S. PATENT DOCUMENTS 4,241,119 12/1980 Smart ............... 174/DIG. 8
4,359,502 11/1982 Caponigro et al. ........... 428/354
4,499,136 2/1985 Nakamura et al. ........... 174/DIG. 8
4,521,470 6/1985 Duerbergh et al. ........... 174/DIG. 8

FOREIGN PATENT DOCUMENTS 3444908 6/1986 Fed. Rep. of Germany .
1483143 8/1977 United Kingdom .
2108625 5/1983 United Kingdom .

Primary Examiner—John E. Kittle
Assistant Examiner—James J. Seidleck
Attorney, Agent, or Firm—Edith A. Rice; Herbert G. Burkard

[57] ABSTRACT

A sleeve, which finds particular application in the environmental sealing of joints between insulated pipes, comprises heat-recoverable polymeric sheet material provided at separate regions of a principle surface thereof with a layer of a heat-activatable adhesive for bonding the sheet to the pipe insulation, and a layer of a sealant to accommodate flexibility in the joint. A layer of a sealing material, having an elongation modulus greater than that of the sealant, overlies at least part of the sealant layer, to improve the pressure retention properties of the sleeve.

11 Claims, 5 Drawing Figures

COATED RECOVERABLE ARTICLES

BACKGROUND OF THE INVENTION

The present invention relates to coated recoverable articles for use in protecting elongate substrates, and more particularly to coated recoverable articles for the environmental sealing of joints in insulated district heating or cooling pipes.

Recoverable wraparound or tubular sleeves are used to provide environmental protection for elongate substrates such as pipelines, by acting as a barrier to moisture or solvent penetration or to mechanical damage. Such sleeves may comprise a cross-linked polyolefin material coated with a mastic or other sealant. The sleeves are preferably heat recoverable, which means that their dimensional configuration can be made to change substantially when subjected to heat. They will usually recover, on heating, towards an original shape from which they have previously been deformed, but the term "heat recoverable" as used herein also includes an article which on heating adopts a new configuration even if it has not been previously deformed.

When district heating pipes, which typically consist of a steel transport pipe insulated by a foam and an outer polyethylene jacket, are to be joined, a length of insulation is first removed from the transport pipe to allow access thereto. Joints between transport pipes are generally made by welding and the heat required would damage any insulation close to the weld line. After the transport pipes have been welded the insulation must be made good across the weld, and one way of doing this is to encase the exposed regions of transport pipe using thin half-shells of sheet material which define a space around the pipe for subsequently filling with an insulating material. Since the material of many types of insulation and also the transport pipes themselves may be impaired by the presence of water, it is usually necessary to provide a water seal when making good this insulation. Such a seal may be provided across the entire joint or, at least around each end of the pair of half-shells and the adjacent pipe insulation. This seal can be provided by a mastic coated recoverable sleeve, for example as described in No. GB-1483113, or more preferably by a sleeve having a band of a heat-activatable adhesive towards each circumferentially extending edge and a band of a mastic between them, as disclosed in No. GB-A-2108625, the disclosure of which is incorporated herein by reference.

The installation of the mastic/adhesive coated sleeves is discussed in the latter published patent application. Briefly, the substrate to be protected is gently pre-heated and the recoverable sleeve is placed in position. This pre-heating reduces installation time and improves bonding. If the sleeve is a wraparound sleeve, it is secured in the wrapped configuration by an adhesive coated path or a mechanical closure. Subsequent application of heat to the sleeve causes:

(a) shrinkage of the sleeve into contact with the pipe or the insulation;

(b) flow of the mastic under the compressive force of the sleeve, so as to fill any voids which may otherwise exist between irregularities on the surface of the pipe or insulation and the recoverable sleeve; and (c) activation of the adhesive so as to form an annular bond between the sleeve and the underlying pipe or insulation.

The installed sleeve provides good environmental sealing, the mastic accomodates thermal expansion and contraction of the substrate, and the adhesive provides the sleeve with improved resistance to soil stress movement.

The joint region is preferably insulated by foamed material, for example by means of pre-formed foam pieces or a liquid foamable material, for example, a foamable polyurethane. As disclosed in No. GB-A-2108625, liquid foamable material may be supplied into a cavity formed between the transport pipes and a hollow casing which surrounds the transport pipes and overlaps the existing pipe insulation at each end. The foamable material may be supplied to the cavity before or after the casing is sealed to the pipe insulation by means of a sleeve, but it is preferred to provide the insulation after making the seal so as to reduce installation time and also to reduce leakage of foam from the cavity. Thus, waste can be minimised and the quality of the insulation can be better controlled. However, while sealing of the cavity before foaming is desirable, the technique suffers from the disadvantage that hitherto, special methods have been required if ballooning of the recoverable sleeve, under the foaming pressure, is to be avoided. A further disadvantage of the existing sleeve is that pressure testing of the seal provided by the sleeve, before foaming, may also lead to ballooning and the formation of leaks.

SUMMARY OF THE INVENTION

We have now devised a recoverable sleeve for sealing an elongate substrate, for example a region of a district heating pipe which has to be insulated, which sleeve, when installed, has an improved capacity to withstand internal pressures whilst maintaining an ability to accommodate expansion and contraction at the joint and a resistance to soil stress movement.

Accordingly, the present invention provides a sleeve for covering an elongate substrate, comprising heat-recoverable polymeric sheet material having:

(a) a first layer of a heat-activatable adhesive at a first region of a principal surface thereof, the adhesive being arranged so as to provide a substantially annular bond between the polymeric sheet and the substrate when in use;

(b) a layer of a sealant (as herein defined) at a second region of the said principal surface; and (c) a layer of sealing material which overlies at least a portion of the sealant layer, and which has an elongation modulus which is greater than that of the sealant.

The sleeve finds particular application in the sealing of insulation around an uninsulated portion of an insulated pipe, in which the portion may be defined axially by existing insulation. The uninsulated portion may be at a joint between two insulated pipes, the insulation of which ends short of the joint. When used on an insulated pipe, the layer of heat-activatable adhesive will generally form a bond to the external surface of the pipe insulation, (which may itself be protected by an exterior pipe jacket and references herein to the pipe insulation should be construed accordingly).

The layer of sealing material which overlies the sealant is selected to have a greater elongation modulus than the sealant so as to increase the resistance to ballooning of the second region of the sleeve. The sealing material may be an adhesive, such as a heat-activatable adhesive for example a hot-melt adhesive or a curable adhesive, or a sealant such as a mastic. An adhesive is preferred as the sealing material, especially a heat-activatable adhesive, since an adhesive is able to bond, at least temporarily, the second region of the sleeve to the underlying pipe, casing or insulation. A high melt or glass transition temperature mastic may also provide a suitable bond. When the sealing material is an adhesive, it is preferably the same as the adhesive on the or each first region of the sleeve for ease of manufacture. In some situations, however, it may be appropriate to use a different adhesive. Generally the layer of sealing material will be made as thin as possible consistent with providing satisfactory pressure retention for the second region of the sleeve for example during foaming of an insulating material, or pressure testing of the seal provided by the sleeve.

The term "sealant" is used herein to refer to materials which have a cohesive strength of the same order as their adhesive strength, and which are used to fill voids and interstices to provide a seal against moisture, dusts, solvents and other fluids. Sealants are viscid, water resistant macromolecular compositions resembling newtonian fluids in exhibiting both viscous and elastic response to stress. They exhibit, in the sense of ASTM 1146, at least second order cohesive blocking (and preferably second order adhesive blocking to metals as well) at a temperature between room temperature and the crystalline melt or glass transition temperature or range of the composition. Known sealant compositions usually comprise mixtures of elastomers, or mixtures of thermoplastic polymers, or both. For information on sealants, in particular hot melt sealants, see Bullman, Adhesives Age, November 1976, pages 25–28.

Some commonly used sealants can be classed as mastics, a mastic being an adherent, cohesive sealing material which can fill a gap between two articles, and which can deform or yield plastically by undergoing viscous flow during application and in subsequent service at ambient temperatures. Mastics may consist of mixtures of substantially non-crystalline materials, for example bituminous materials, elastomers, or thermoplastic polymers, and may contain inert or powdered fillers.

The arrangement heat activatable adhesive, sealant and sealing material on the present sleeve has the significant advantage of combining the ability to withstand relatively high pressures during assembly of a joint with an ability to maintain the seal after assembly during movement such as expansion, contraction and flexing of the pipe. Even if such movement results in the breaking of the bond between the layer of sealing material and the underlying pipe, casing or insulation, the layer of flowable sealant can continue to provide a seal, and this capability can be enhanced by residual recovery tension remaining in the installed sleeve which can cause the sealant to flow and fill any voids formed by expansion and contraction, or flexing, of the pipe. Also, any cut-through damage to the sleeve resulting in the formation of a hole therethrough may be selfsealed by mastic being forced into the hole under pressure of the sleeve.

The layer of heat-activatable adhesive at the first region of the sleeve is able to provide an annular bond between the sleeve and the pipe insulation, or between the sleeve and a joint casing, or both. Such a bond can resist creep of the sleeve along the pipe which would otherwise result from the large forces generated by earth movement (soil stress movement) and by pipe expansion and contraction. By virtue of the heat-activatable adhesive, the sleeve overcomes the problems of creep which are common in the use of mastic coated sleeves.

The ability of the present sleeve to withstand higher installation pressures leads to significant advantages both in terms of assembly of a joint and of subsequent use. Thus an insulated pipe joint, sealed by the present sleeve, may be insulated by use of a liquid foamable material, poured into the space between a hollow casing and the joined pipes. This method overcomes problems associated with the use of pre-formed foam inserts, of maintenance of a large inventory and of obtaining void-free insulation. Furthermore, by appropriate selection of sealant and sealing material, the sleeve can be arranged to withstand the pressures exerted during formation of a foam of suitable density to provide satisfactory insulation. Hitherto, in the absence of a sleeve which can withstand such foaming pressures, it has been common practice to supply foamable material to the joint region before sealing the joint region with a sleeve. This technique is disadvantageous since foam is able to leak out from the joint region, which reduces the control over the quality of the insulation, and which is also wasteful. The technique is also inconvenient since, once the foam has hardened, it is necessary to clean leaked foam from the joint region and then to install a sleeve, resulting in an increased installation time. Furthermore, the prior art method does not allow for pressure testing of the seal provided by the sleeve, which testing must be carried out before the joint region is filled with foam. To overcome the problems associated with this prior art method, it has been proposed to use a special and more expensive foam which does not generate a high gas pressure, or to seal the joint initially with temporary sealing means which can withstand the pressure, and replacing the temporary sealing means with a sleeve which can seal the pipe joint on a long term basis, and accomodate movement of the pipe due to, for example, expansion and contraction. The latter method is laborious and the necessity of sealing the joint twice increases the installation time. The present invention thus provides a sleeve for conveniently sealing a joint between district heating pipes, which joint can be insulated in a controlled manner with dense and substantially void-free foamed material. The seal can be pressure tested by application of test pressure, for example of 20 $kNm^{-2}$, preferably 100 $kNm^{-2}$, for 30 minutes to the space between the joined pipes, pipes and the surrounding hollow casing. By appropriate selection of materials, the present sleeve can be arranged to withstand foaming pressures in excess of 200 $kNm^{-2}$, preferably 350 $kNm^{-2}$, more preferably 500 $kNm^{-2}$.

The respective layers of sealing material and heat activatable adhesive provided at appropriate regions of a principal surface of the sleeve are exterior layers at those regions, rather than some intermediate layer of a multi-layer laminate, although particularly when the sealing material is a sealant, it may be covered by, for example, a release layer which has no function in the installed product. Where the sleeve is used to protect the exterior surface of a pipe, the sealing material and adhesive will of course be on the internal surface of the sleeve.

The insulating material preferably comprises a foam, especially a material supplied as a foamable liquid. The insulating material may be placed in situ before or after surrounding the uninsulated portions of the pipe with the hollow casing, depending on the form in which it is provided, although generally speaking, when supplied as a foamable liquid, it will be poured around the uninsulated portions of the pipe after installation of the casing.

In a further aspect, the invention provides a method of insulating a cavity around an uninsulated portion of an insulated pipe, the method comprising:

(a) surrounding the uninsulated portion of pipe with a hollow casing;

(b) installing around the an of the casing a sleeve according to the invention, such that the layer of sealant is positioned so as to bridge the end of the casing and the adjacent insulation of the pipe, substantially around their entire peripheries, and the first layer of heat-activatable adhesive is positioned so as to form a substantially annular bond between the sleeve and the insulation of the pipe;

(c) heating the sleeve to cause the polymeric material to recover, the sealant and sealing material to soften and the heat-activatable adhesive to be activated; and (d) providing insulating material in the space around the uninsulated portion of the pipe, between the pipe and the hollow casing.

The insulation around the joint may be provided by a foamable material which can be introduced into the cavity around the uninsulated pipe. It is envisaged that the insulation may also be provided by half-shells of a insulating material having an appropriate shape. Such insulation may itself be the casing, or a casing may be used in addition to the insulation.

When a pourable insulating material is used, it may be introduced into the space around the uninsulated portion of pipe through a hole in the casing. The hole must subsequently be closed. This may be achieved for example by means of a recoverable sleeve or a closure patch, the patch comprising a polymeric backing sheet and an adhesive coating.

The method of the invention may be used to insulate a joint between two insulated pipes, in which case the uninsulated portion of pipe will include a joint between the pipes, preferably a welded joint.

In a yet further aspect, the invention provides a pipe joint which comprises:

(a) two insulated pipes joined together, the insulation of each of which ends short of the joint;

(b) a hollow casing surrounding the exposed end portions of the joined pipes; and (c) a sleeve according to the present invention, positioned such that the layer of sealant bridges an end of the casing and the insulation of one of the pipes, around substantially their entire peripheries, and recovered such that the first layer of heat activatable adhesive forms a substantially annular bond between the sleeve and the insulation of the said pipe.

The size and shape of the region of hot-melt or other heat-activatable adhesive on the heat-recoverable sheet is not critical, but will preferably be such as to prevent slipping of the sleeve and to prevent the ends of the sleeve becoming detached from the pipe insulation. We have found that an annular bond will give the desired benefits, but this is not to be construed as being limited to a complete closed ring of bonding around the pipe insulation. In some circumstances it will be sufficient to provide spots or patches or heat-activatable adhesive arranged to bond around the circumference of the pipe insulation such that the envelope of such spots or patches is generally annular in shape. Although one region of heat-activatable adhesive can be sufficient, we prefer that two be provided, one towards each of two opposite ends of the sleeve. The second region of the sleeve, which is provided with a layer of sealant, will then be a middle region. When the sealant is provided in a middle region of the sleeve, that region may be dimensioned to bridge the entire length of the casing, onto the pipe insulation at each end of the casing. The regions of heat-activatable adhesive may then form a substantially annular bond at each end of the sleeve, between the sleeve and the pipe insulation. More preferably, the region of sealant is dimensioned to bridge just an end portion of the casing and the pipe insulation. The regions of heat-activatable adhesive may then form substantially annular bonds between the sleeve and the casing and between the sleeve and the pipe insulation. This arrangement is preferred since it allows one form of sleeve to be used on pipes having a wide range of dimensions.

The layer of sealing material may overlie the whole of the layer of the sealant. This can be advantageous since it can reduce undesirable flow of sealant during installation or use. The layer of sealing material may alternatively overlie less than the whole of the layer of sealant, for example it may be arranged just to overlie the part of the sealant layer which is to bridge the casing and the pipe insulation. This arrangement can be advantageous since it facilitates flow of mastic in the joint region.

Preferably, the sleeve of the invention is provided with a reinforcing sheet at the interface between the layer of sealant and the layer of sealing material, to prevent intermixing of the two layers when softened as a result of heating. The sheet preferably comprises polymeric material, which may be cross-linked; the material is preferably, but need not necessarily be, recoverable. In some circumstances however, selection of appropriate materials of the layers may make use of the sheet unnecessary or even undesirable.

Preferably the materials of the sleeve are selected so that the recovery temperature of the sheet material, the softening temperature of the sealant and sealing material and the activation temperature of the adhesive are compatible. The sleeve can be coated with a temperature indicating composition to give the installer an indication of when sufficient heat has been applied to soften the sealant and/or to activate the adhesive.

The sleeve will generally be produced by extrusion as a flat strip, but tubular extrusion and cutting is an alternative. The cross-linking and expansion steps can be carried out as part of the same process. Similarly, the coating operation can be made part of the same production line, and may be carried out by pressure lamination, or coextrusion. The sleeve can conveniently be produced and supplied in long spooled lengths so that a suitable length can be cut-off, depending on the diameter of pipe to be protected.

The precise construction of the sleeve will depend on the specific application, and the variables to be considered include the following: width of sleeve; shrink ratio of sleeve; size, shape and number of first regions of heat-activatable adhesive; thickness of the layers of sealant, and adhesive; and the nature of the materials of these layers. For a discussion of these variables, reference may be made to No. GB-A-2108625.

The dimensions of the sleeve will be selected according to the application. The sleeve may have a width of up to 400 mm, for example 220 mm or 300 mm, although wider sleeves may also be employed where necessary. The region of the sleeve coated with sealant may be, for example from 30% to 80% of the total width, preferably from 40% to 60% of the total width. The layer of sealing material may overlie all or just a part of the sealant, it being preferred to leave opposite longitudinally extending edge regions of the sealant exposed to facilitate flow thereof in the region of a joint. Thus the overlying layer of sealing material, and the reinforcing sheet when present, may cover from 20% to 100% of the layer of sealant, preferably from 40% to 80%. The sealing material will generally, but need not necessarily, be placed centrally on the layer of sealant. The layer of heat-activatable adhesive will generally cover that part of the polymeric sheet not coated with mastic. In a preferred embodiment, the heat-activatable adhesive is provided in two longitudinally extending strips, one on each side of the region of sealant. The thickness of the components of the sleeve will depend on the application, and on the environment to be encountered when in use. For example, the sheet material may have a thickness from 0.3 to 1.2 mm, preferably from 0.5 to 0.8 mm. The thickness of the layers of sealant and of heat-activatable may be substantially the same. The thickness of the overlying layer of sealing material will be selected to be capable of withstanding the pressures exerted during foaming or while pressure testing, but also to be capable of accomodating movement in the joint; it will depend on whether a reinforcing sheet is present. The sealing material and reinforcing sheet may each be, for example from 0.3 to 1.0 mm thick, preferably from 0.4 to 0.7 mm thick. When no reinforcing sheet is present, the layer of sealing material may be from 0.5 to 1.2 mm thick.

In another aspect, the invention provides a kit of parts for covering a pipe, comprising:

(a) a first polymeric sheet comprising a layer of sealing material; and (b) a second polymeric sheet which is heat-recoverable and has a layer of a heat-activatable adhesive at a first region of a principal surface of the sheet, and a layer of a sealant (as herein defined), at a second region of the said principal surface, the elongation modulus of the sealant being less than that of the sealing material;

the sheets being of such a shape and size that they can be positioned with the sealing material layer between the second sheet and the pipe, such that at least part of the heat activatable adhesive layer on the second sheet is available to bond the second sheet to the pipe on heating.

The first polymeric sheet of the kit may consist of a layer of sealing material, or a sheet that is coated with a sealing material and that, preferably is heat-recoverable. In use, the first polymeric sheet of the kit may be installed, for example around the overlap region between a hollow casing and the insulation of a pipe, with the sealing material in contact with the casing and the insulation. The second polymeric sleeve may then be positioned over the first sleeve, such that the layer of sealant on the second sleeve overlies the first sheet, and such that when the second sleeve is heated to effect recovery thereof, the layer of heat-activatable adhesive forms a substantially annular bond to the pipe insulation. Alternatively, the kit may be assembled by positioning the first sheet on the sealant layer of the second sheet, and optionally bonding the first sheet to the second sheet, before the sheets are wrapped around a pipe. It will be understood that the kit of parts, when assembled, can provide a sleeve according to the present invention, and that the above discussion concerning the materials and configurations of sleeves can, where appropriate, be applied to the polymeric sheets of the kit.

Embodiments of sleeves and pipe joints in accordance with the present invention will now be described, by way of example, with reference to the accompanying drawings in which:

DETAILED DESCRIPTION OF THE PREFERRED EMBODIMENTS

Figure 1A:
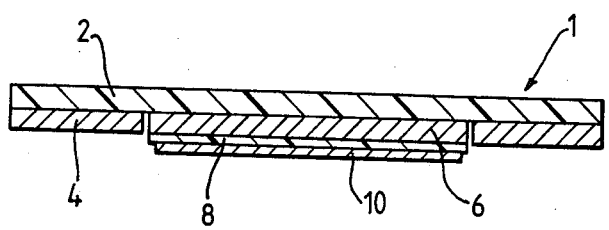
FIGS. 1a, 1b, and 1c are cross-sections through coated sleeves.
Figure 1B:
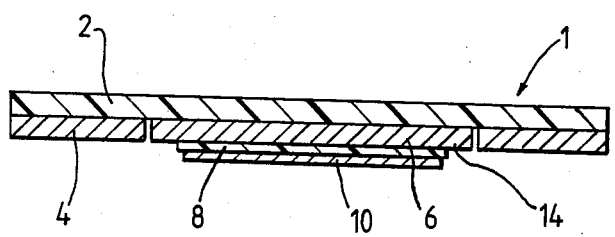
Figure 1C:
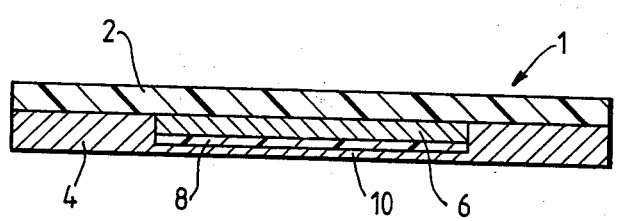

FIGS. 1a, 1b and 1c each show a sleeve 1, which comprises a heat-recoverable polymeric sheet 2, having a recovery ratio preferably between 25% and 33% and a thickness of about 1 mm. The sheet is coated towards its edges with two longitudinally extending strips 4 of hot-melt adhesive, the strips being about 45 mm wide, and with a central coating of a strip 6 of mastic having a width of about 130 mm and thickness about 0.5 mm. The mastic 6 has an overlying reinforcing sheet 8 of cross-linked polyethylene, over which is provided a further layer of a sealing material 10. The sealing material 10 is a hot-melt adhesive.

In the embodiment shown in FIG. 1b, mastic strips 14 are left exposed by the polyethylene sheet 8 and hot-melt adhesive 10 to facilitate flow of mastic in the region of a joint. Extra mastic may be incorporated into the strips 14, for example to fill voids.

The dimensions (in mm) of the components of the sleeve shown diagramatically in FIG. 1b are as follows:

|  | Width | Thickness |
|---|---|---|
| Sheet 2 | 300 | 0.7 |
| Strips 4 | 75 | 0.7 |
| Strip 6 | 150 | 0.7 |
| Sheet 8 | 80 | 0.5 |
| Material 10 | 80 | 0.5 |
| Strips 14 | 35 | 0.7 |

In the embodiment shown in FIG. 1c, the layers of hot-melt adhesive 4, 10 are applied to the polymeric sheet 2 and to the mastic 6 and sheet 8, as one layer.

Figure 2:
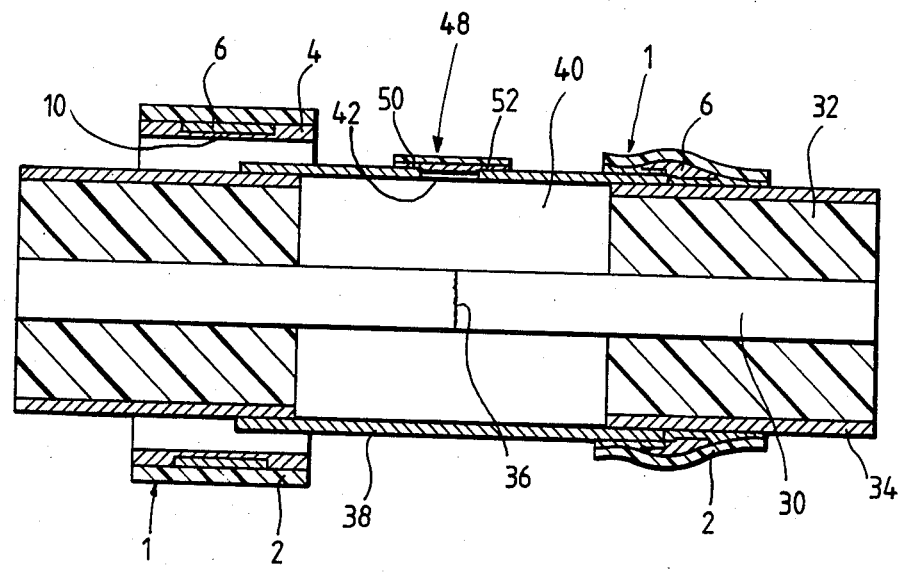
FIGS. 2 and 3 show the sleeve of FIG. 1c positioned and installed around a joint in between two insulated pipes.
Figure 3:
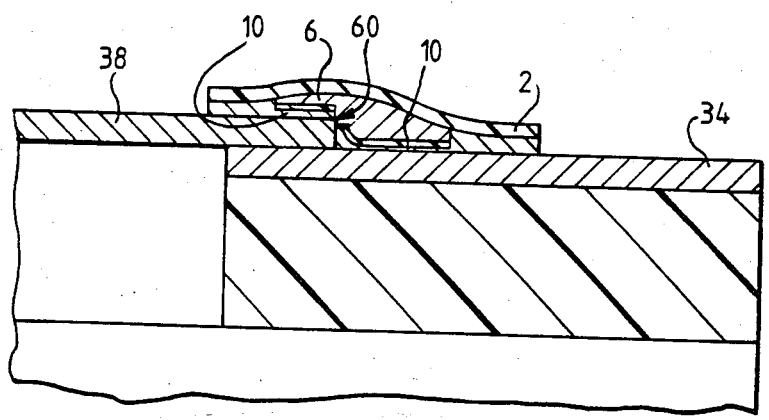

FIGS. 2 and 3 show the application of the sleeve shown in FIG. 1c to a joint in an insulated pipe. Such pipes are used in district heating systems, in which joints generally require moisture and environmental sealing, and also continuity of insulation. The invention is particularly useful in conjunction with district heating pipes having a steel transport pipe surrounded by polyurethane foam and a polyethylene jacket. However, excellent results can be obtained with other transport pipes such as copper or cross-linked polyethylene, with other insulations such as glass wool, and with other outer jackets such as PVC or asbestos cement.

In FIGS. 2 and 3, pipes 30 are surrounded by insulation, here shown as polyurethane foam 32 and an outer jacket 34. In each of the figures two pipes are joined by a weld line 36, although other joining techniques could be used.

In use, the uninsulated portions of the pipes 30 are welded together, as shown at 36, and a tubular casing 38 is positioned over the weld region so as to overlap the insulation 32 and the outer jacket 34 of one of the pipes at each end. The casing is joined to the outer jacket by means of a sleeve 1c which is positioned such that the strip of mastic 6 bridges an end of the casing 38 and the adjacent end of the pipe jacket, as shown at the left-hand side of the pipe joint of FIG. 2. The strips of hot-melt adhesive are thus positioned as to form annular bonds between the polymeric sheet 2 and the pipe jacket 34, and between the sheet 2 and the casing 38.

On application of heat to the sleeve, for example by means of a gas torch, the layers 4, 10 of adhesive melt, the sealant softens and the sheet 2 shrinks into conformity with the casing so that the layer 10 of hot-melt adhesive and the sealant 6 fill any voids in the region of overlap of the casing with the pipe jacket, and so that the strips 4 of hot-melt adhesive form annular bonds, as mentioned above. The installed sleeve is shown at the right-hand side of the illustrated pipe joints.

The layer 10 of hot-melt adhesive forms a bond between the sleeve and the casing 38 and the jacket 34, to ensure a high elongation modulus of the sleeve in the overlap region. The improved strength of the present sleeve allows the seal provided by the installed sleeve to be tested in a convenient manner by applying a pressure to the cavity 10 defined by the casing 38, and monitoring the change in pressure over a period of time. The testing may be carried out via a hole 42 in the wall of the casing.

To minimise heat-loss from the joint region, it is necessary to make good the insulation in the cavity 40. Preferably, the cavity will be filled with foam insulation: the foam may be in the form of pre-formed blocks which are installed around the uninsulated portions of the pipes 30 before the jacket 38 is positioned over the joint region. More preferably however, the cavity will be filled by a foamable material poured into the cavity 40 through the hole 42. Non-foamable fluid insulating materials may also be introduced through the hole 42.

After the insulating material has been introduced (and where necessary after foaming is complete) the hole 42 is preferably stopped in order that the insulating material be protected against moisture. This can be done by providing a single sleeve of sufficient width to extend from one pipe jacket 34 to the other. However, better results have been obtained by stopping the hole 42 with a closure patch 48 comprising a polymeric backing sheet 50 and an adhesive coating 52. The backing sheet 50 is preferably a dimensionally stable cross-linked polyolefin and the adhesive 52 is preferably hot melt or other heat-activatable adhesive. Where the adhesive is heat-activatable, the backing sheet 50 may be provided on its exposed surface with a temperature indicating composition (such as a paint which changes colour) to help the installer judge when sufficient heat has been applied to produce a satisfactory bond. The closure patch 48 may be used in conjunction with a plug. The plug may be retained in the hole 42, or may be used temporarily until the insulation material had set or finished foaming and then removed before the application of the closure patch. It may be preferred that the plug be removed where the completed joint is to have a highly uniform surface, and where earth movements are likely to damage it. However, in certain circumstances the plug may be left in place and the closure patch used for additional protection.

The ability of the present sleeve to withstand higher pressures ensures that insulation foamed in situ can be made more dense substantially without damaging the seal provided by the sleeve.

FIG. 3 shows how the sleeve of the invention can accomodate relative movement between the insulated pipes 30. Since the layer 10 of hot-melt adhesive is thin, movement of the casing 38 relative to the jacket 34 causes the adhesive and the polyethylene sheet 8 to crack as shown at 60. Residual tension in the polymeric sheet 2 causes the mastic 6 to fill any cracks thus formed and so maintains the seal of the joint region.

We claim:

1. A sleeve for sealing an end of a joint between two insulated pipes from which the insulation has been removed at the ends thereof exposing uninsulated end portions over which a hollow casing capable of accommodating a foam insulation material has been positioned so as to overlap the pipe insulation at each end of the joint, said sleeve comprising a heat-recoverable polymeric sheet having:
   (a) a first layer of a heat-activatable adhesive at a region of a principal surface of the sheet, the adhesive being arranged so as to provide a substantially annular bond between the polymeric sheet and the pipe insulation at one side of the joint;
   (b) a layer of sealant at a second region of the said principal surface; and
   (c) a layer of a sealing material which overlies at least a portion of the layer of sealant, and which has an elongation modulus that is greater than that of the sealant;

each of said sealant and said sealing material being arranged so as to bridge said casing and the pipe insulation at said one side of the joint.

2. A sleeve as claimed in claim 1, wherein a second layer of heat activatable adhesive is provided at a third region of said principal surface, the sealant being arranged between said first and second layers of heat activatable adhesive.

3. A sleeve as claimed in claim 2, wherein each layer of heat activatable adhesive is arranged to provide a continuous annular bond around the circumference of the pipe.

4. A sleeve as claimed in claim 2, wherein said second layer of heat activatable adheisve is arranged so as to provide a substantially annular bond between the polymeric sheet and the casing.

5. A sleeve as claimed in claim 2, wherein said second layer of heat activatable adhesive is arranged so as to provide a substantially annular bond between the polymeric sheet and the pipe insulation at the other side of the joint and said layer of sealing material is arranged so as to bridge said casing and said pipe insulation at each side of the joint.

6. A sleeve as claimed in claim 1, wherein the layer of sealing material is a further layer of a heat-activatable adhesive.

7. A sleeve as claimed in claim 2, wherein the layers of heat-activatable adhesive and of sealing material comprise the same material.

8. A sleeve as claimed in claim 1, wherein a reinforcing sheet is provided at the interface between the layer of sealant and the layer of sealing material.

9. A sleeve as claimed in claim 8, wherein the reinforcing sheet comprises a polymer, preferably a heat-recoverable polymer.

10. A sleeve as claimed in claim 1, which is a wrap-around sleeve.

11. A sleeve as claimed in claim 8, wherein the first and second regions are strips which run substantially parallel to an edge of the sleeve.

* * * * *